(12) United States Patent
Oare et al.

(10) Patent No.: US 7,757,980 B2
(45) Date of Patent: Jul. 20, 2010

(54) BALED AGRICULTURAL CROP PRODUCT UNBALING APPARATUS AND METHOD OF USING SAME

(76) Inventors: Patrick James Oare, Diversified Agricultural and Industrial Markets, I, P.O. Box 426, Johnstown, NY (US) 12095; Christian Hansen Oare, Diversified Agricultural and Industrial Markets, I, P.O. Box 426, Johnstown, NY (US) 12095

( * ) Notice: Subject to any disclaimer, the term of this patent is extended or adjusted under 35 U.S.C. 154(b) by 91 days.

(21) Appl. No.: 12/037,870

(22) Filed: Feb. 26, 2008

(65) Prior Publication Data

US 2009/0212144 A1 Aug. 27, 2009

(51) Int. Cl.
*B02C 19/00* (2006.01)
(52) U.S. Cl. .................. 241/30; 241/101.76; 241/222; 241/235; 241/605
(58) Field of Classification Search .................. 241/605, 241/30, 62, 101.76, 222, 235
See application file for complete search history.

(56) References Cited

U.S. PATENT DOCUMENTS

| | | | |
|---|---|---|---|
| 3,883,081 A | 5/1975 | Dahl et al. | |
| 5,099,755 A | 3/1992 | Montano et al. | |
| 6,059,515 A | 5/2000 | Keller et al. | |
| 6,116,838 A | 9/2000 | Whatley et al. | |
| 6,171,047 B1 | 1/2001 | Vandervalk | |
| 6,431,480 B1 | 8/2002 | Hruska | |
| 6,708,911 B2 | 3/2004 | Patterson et al. | |
| 6,711,881 B1 | 3/2004 | McCracken et al. | |
| 6,966,512 B1 | 11/2005 | Simpson | |

FOREIGN PATENT DOCUMENTS

CA  2104482  2/1995

OTHER PUBLICATIONS

Duratech Industries: http://www.haybuster.com; found on Nov. 30, 2006. Published on the Internet.

*Primary Examiner*—Mark Rosenbaum
(74) *Attorney, Agent, or Firm*—Delain Law Office PLLC; Nancy Baum Delain

(57) ABSTRACT

An apparatus and method for using the apparatus is taught for decreasing the density of and feeding into a convention small baler agricultural crop product that has been compressed into several flakes, the flakes having been then further compressed into a large bale, the apparatus comprising a material bed and pusher assembly; a staging area; a set of feeder rollers; a set of drawing rollers; a metering assembly; a chaff discharge system; and a small baler. A method of using the apparatus is also taught. Baled agricultural crop product that is passed through the taught apparatus and method indistinguishably resembles agricultural crop product that has never been baled.

25 Claims, 11 Drawing Sheets

BALED AGRICULTURAL CROP PRODUCT UNBALING APPARATUS AND METHOD OF USING SAME

BACKGROUND OF THE INVENTION

1. Field of the Invention

This invention is in the art of farm equipment and methods of using same, specifically within the art of unbaling agricultural crop products such as hay, straw, fodder, and other similar products.

2. Description of Related Art

Fresh agricultural crop product such as hay, straw, fodder, and other similar products that have never been baled comprise a palatable feed for most hoofed farm animals and for some other farm animals. However, unbaled agricultural crop product is impractical to move from field to farm. Agricultural crop product is therefore generally compressed into small units called flakes, which are then further compressed and tied together into bales, making the agricultural crop product easier to handle but less palatable for farm animals and less attractive to potential purchasers.

Several apparatuses and methods of using them exist in the art for unbaling and dispersing agricultural crop product flakes; however, no apparatus or method is known to exist that successfully breaks up agricultural crop product flakes such that the agricultural crop product appears never to have been baled. A need has long been felt in the art for such an apparatus and method.

BRIEF SUMMARY OF THE INVENTION

The present invention teaches a machine and method for removing agricultural crop product from bales in a manner that produces agricultural crop product that indistinguishably simulates agricultural crop product that has never been baled or put into flakes.

DETAILED DESCRIPTION OF THE INVENTION

Figure 1:
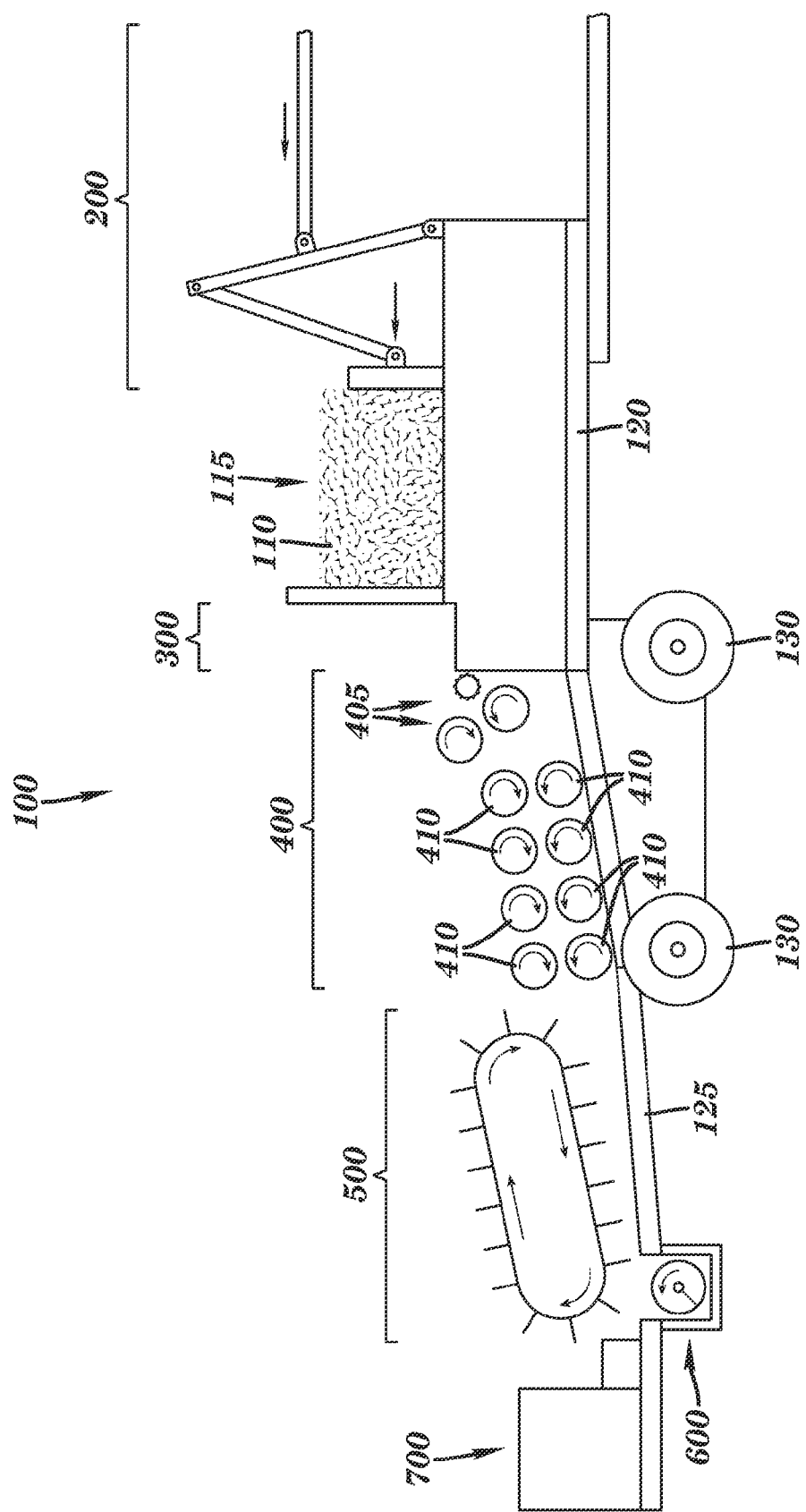
Referring now to FIG. 1, an overview of an agricultural crop product unbaler is shown.

Referring now to FIG. 1, an overview of an apparatus 100 is shown for significantly decreasing the density of an agricultural crop product 105 such as hay, straw, or other fodder that has been packaged into several small units called flakes 110, the flakes 110 then having been compressed into large bales 115 for storage and shipment from the field.

The apparatus 100 comprises a bed and pusher assembly 200 whereupon several flakes 110 are placed; a staging area 300 whereupon flakes 110 are manually and/or mechanically separated from the bale 115 and moved toward an intake chamber 400; an intake chamber 400 containing a set of feeder rollers 405 wherein the set may contain three (shown), four, or five feeder rollers 405, and a set of drawing rollers 410, the feeder rollers 405 functioning to initiate decomposition of the flakes 110 through forcible deflection and control the feeding of the flakes 110 into the drawing rollers 410, and the drawing rollers 410 functioning to draw out the flakes 110 and separate the agricultural crop product 105 contained in the bales 115; a metering assembly 500 wherein a measured amount of agricultural crop product 105 is gathered; a chaff discharge system 600 that functions to rid the finished product of chaff; and a small baler 700 wherein the agricultural crop product is packaged for distribution to its final destination.

In a preferred embodiment, the pusher assembly 200, staging area 300, and intake chamber 400 are mounted on a mobile chassis 120; however, other mountings are also within the scope of the invention.

The metering assembly 500 and chaff discharge system 600 are, in a preferred embodiment, integrated together on a second chassis 125. An optional set of detachable wheels 130, which facilitates the mounting of a small baler 700 on the second chassis 125, may be mounted on the second chassis 125. However, other embodiments exist within the scope of the invention.

Figure 2:
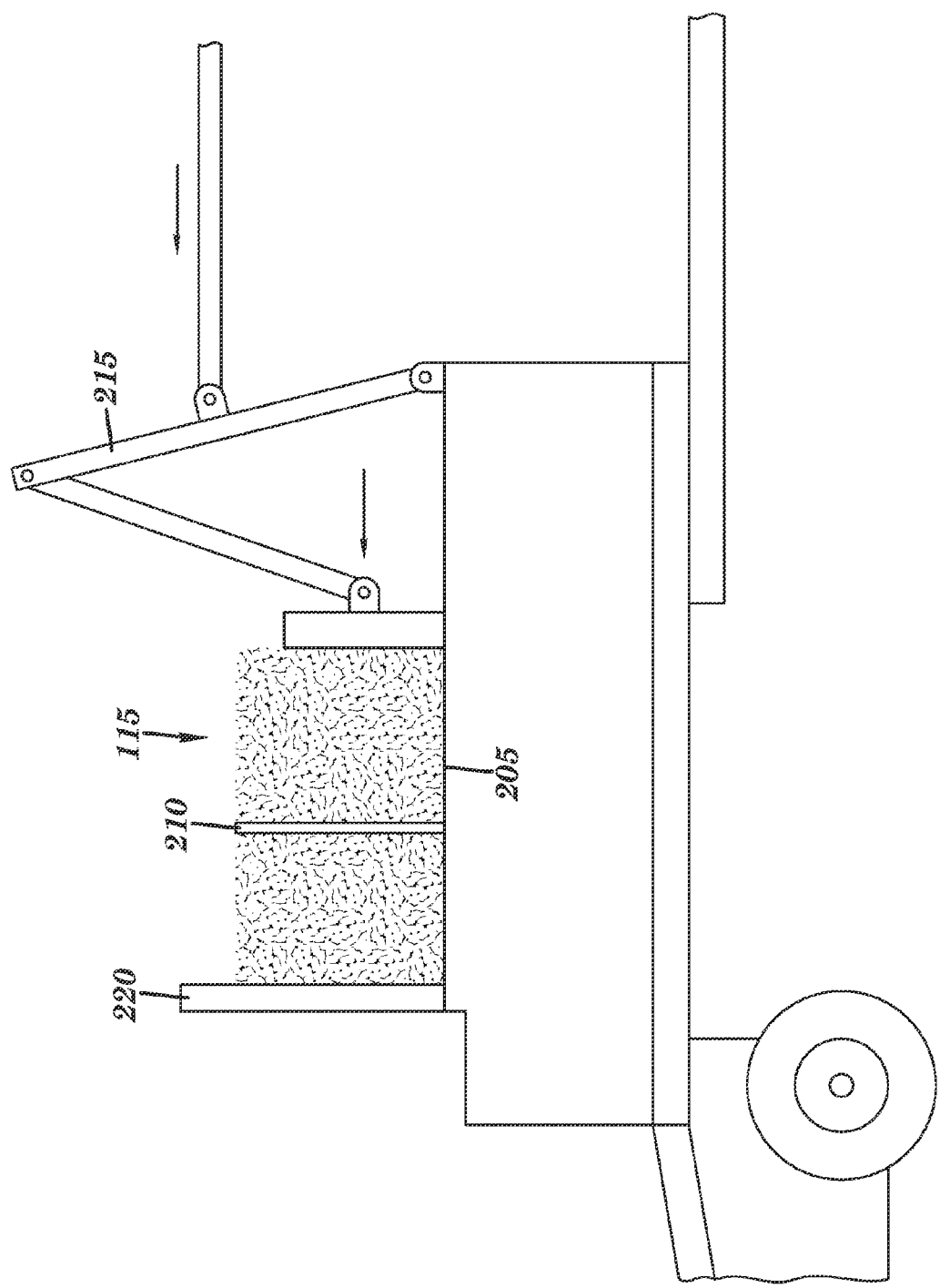
Referring now to FIG. 2, a set of agricultural crop product feeder rollers within an agricultural crop product unbaler is shown.

Referring now to FIG. 2, a substantially rectangularly solid large bale 115 of agricultural crop product 105 is set on a material bed 205 where any banding 210 holding the bale 115 together is removed. A high knee pusher 215 or other mechanism advances the baled agricultural crop product 105 to a flaker 220 that peels individual flakes 110 from the large bale 115.

Figure 3:
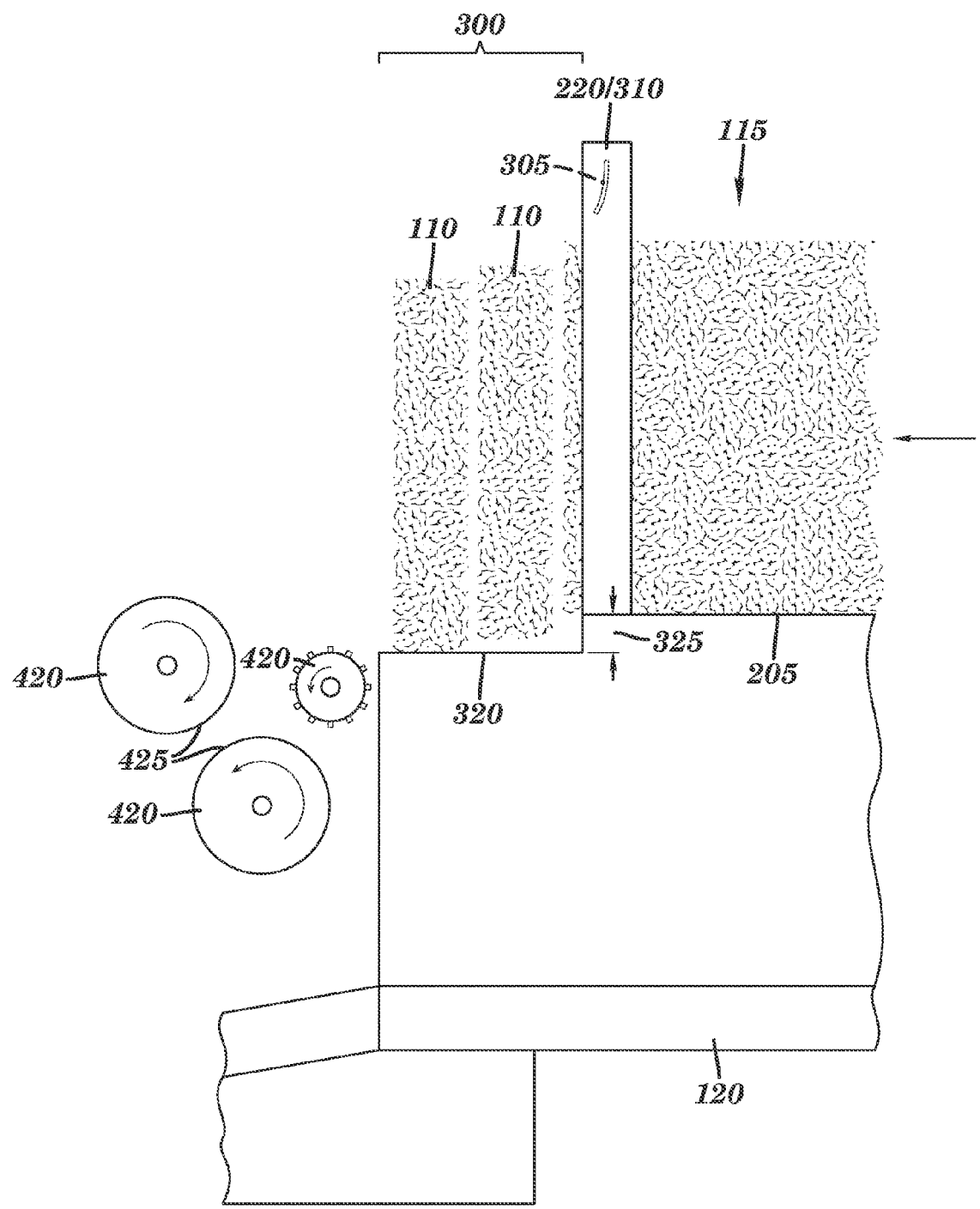
Referring now to FIG. 3, flakes are pushed onto a staging area where the individual flakes are prepared to be fed into an intake chamber. Spring fingers and a hoop hold the flakes on the staging area, preventing the flakes from premature advancement.

Referring now to FIG. 3, the flakes 110 are pushed onto a staging area 300 where the individual flakes 110 are prepared to be fed into an intake chamber 400. Spring fingers 305 and a hoop 310 hold the flakes 115 on the staging area 300, preventing the flakes 115 from premature advancement The agricultural crop product 105 is advanced on demand to a flaker 220 by a hydraulic ram 312 controlled by a hydraulic valve 315. The flaker deck 320 is on a parallel plane with the material bed 205, but with a one- to two-inch drop 325 in vertical height with respect to the vertical axis. This drop 325 aids in the separation of individual flakes 110 from the bale 115 by reducing contact area between the unbaler 100 and the bale 115.

Figure 4A:
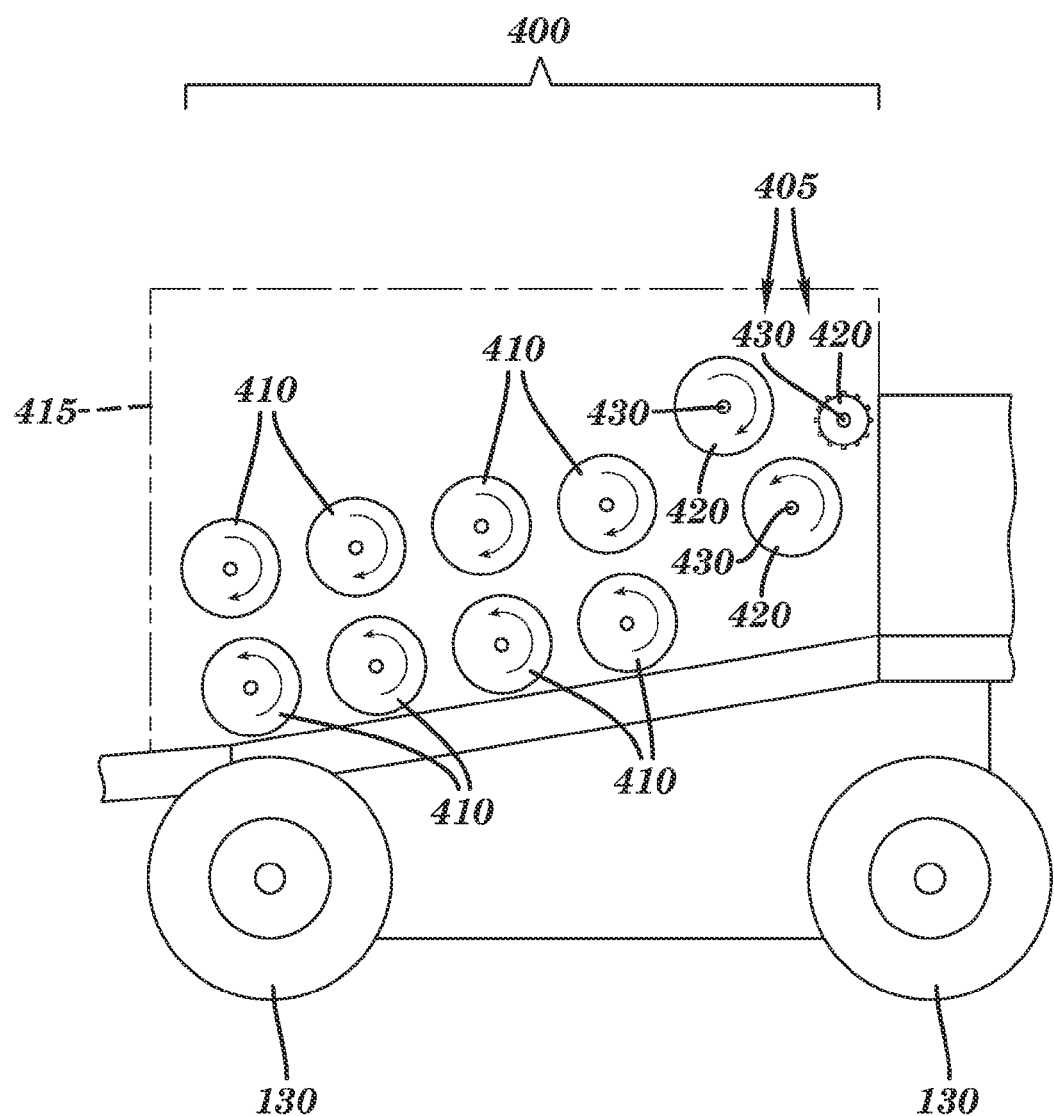
Referring now to FIG. 4, a set of elongation cylinders within an agricultural crop product unbaler is shown.
Figure 4B:
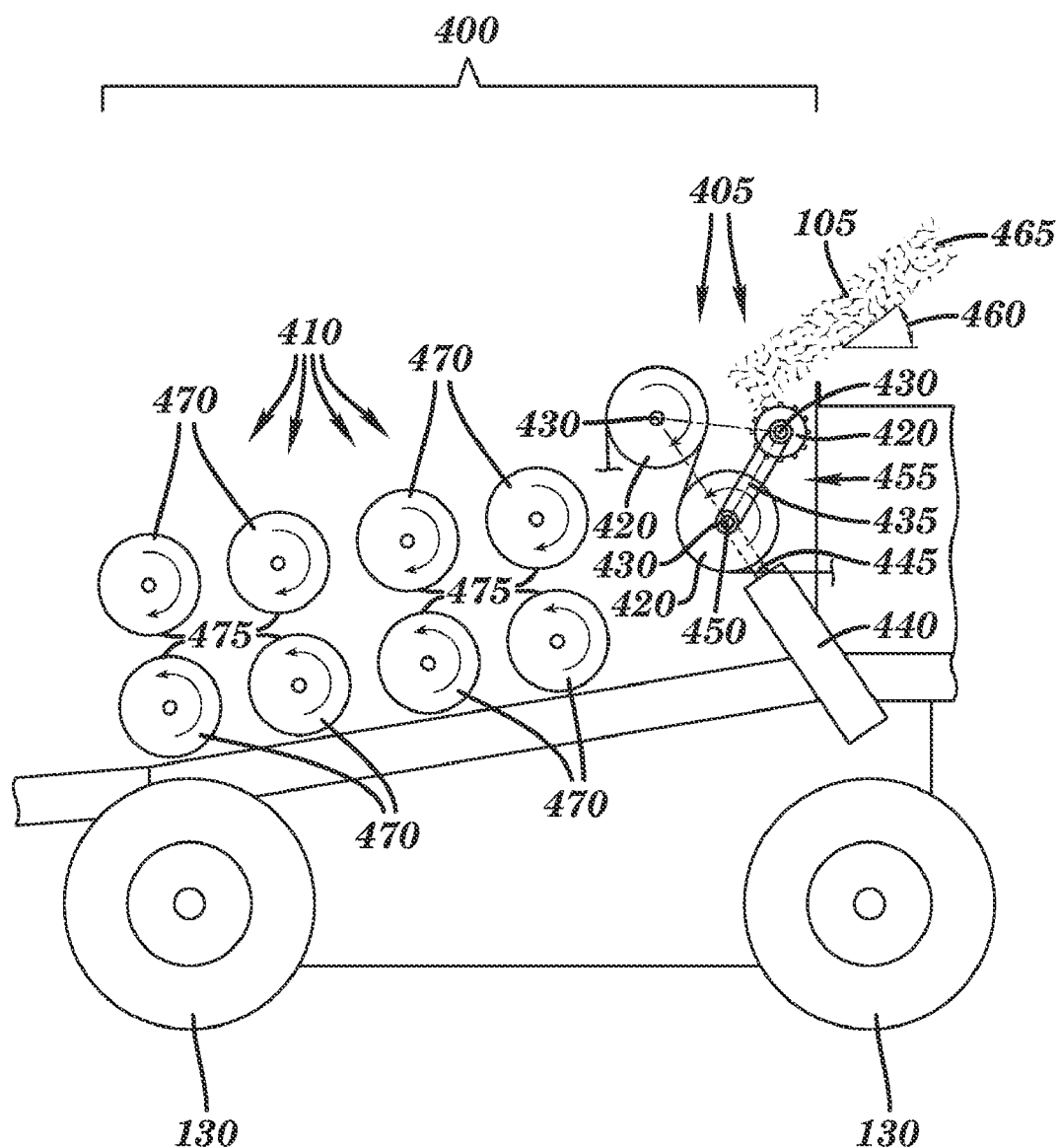

Referring now to FIG. 4, the flakes 110 are fed into an intake chamber 400 containing at least one set of feeder rollers 405 and at least one set of drawing rollers 410. In a preferred embodiment, there are three feeder rollers 405; however, there may be more or fewer feeder rollers 405 within the scope of the invention. In another embodiment, the intake chamber 400 is enclosed in a casing 415, but an unenclosed chamber 400 is also within the scope of the invention.

Individual flakes 110 are fed through at least one set of feeder rollers 405 into at least one set of drawing rollers 410. The feeder rollers comprise a plurality of horizontal cylinders 420, numbering three in a preferred embodiment, having faces 425 that work in conjunction with each other to feed agricultural crop product forward through the feeder rollers 405. The axes of rotation 430 for the cylinders 420 are located on the vertices of a polyhedron 435, a triangle in a preferred embodiment. Pressure exerted on the agricultural crop product 105 as it passes through the feeder rollers 405 is generated by tension springs or a compression mechanism such as air bags 440 attached to shafts 445 that pass through the center 450 of the cylinders 420. Other pressure generating mechanisms are also within the scope of the invention. The drive system 455 of this group is positive and reversible. The drive system 455 does not allow freewheeling of the feeder rollers 405.

The agricultural crop product 105 is fed through the feeder rollers 405 at various angles 460. The angles 460, which, within the scope of the invention, may range from substantially 0° to substantially 180°, assist the feeder rollers 405 in loosening friction bonds 465 within the compressed agricultural crop product 105. In a preferred embodiment, the angles 460 range from substantially 30° to substantially 90°. The angles 460 increase from the first to the last set of feeder rollers 405, such that the initial angle 460 is less than the subsequent angles 460.

Figure 4C:
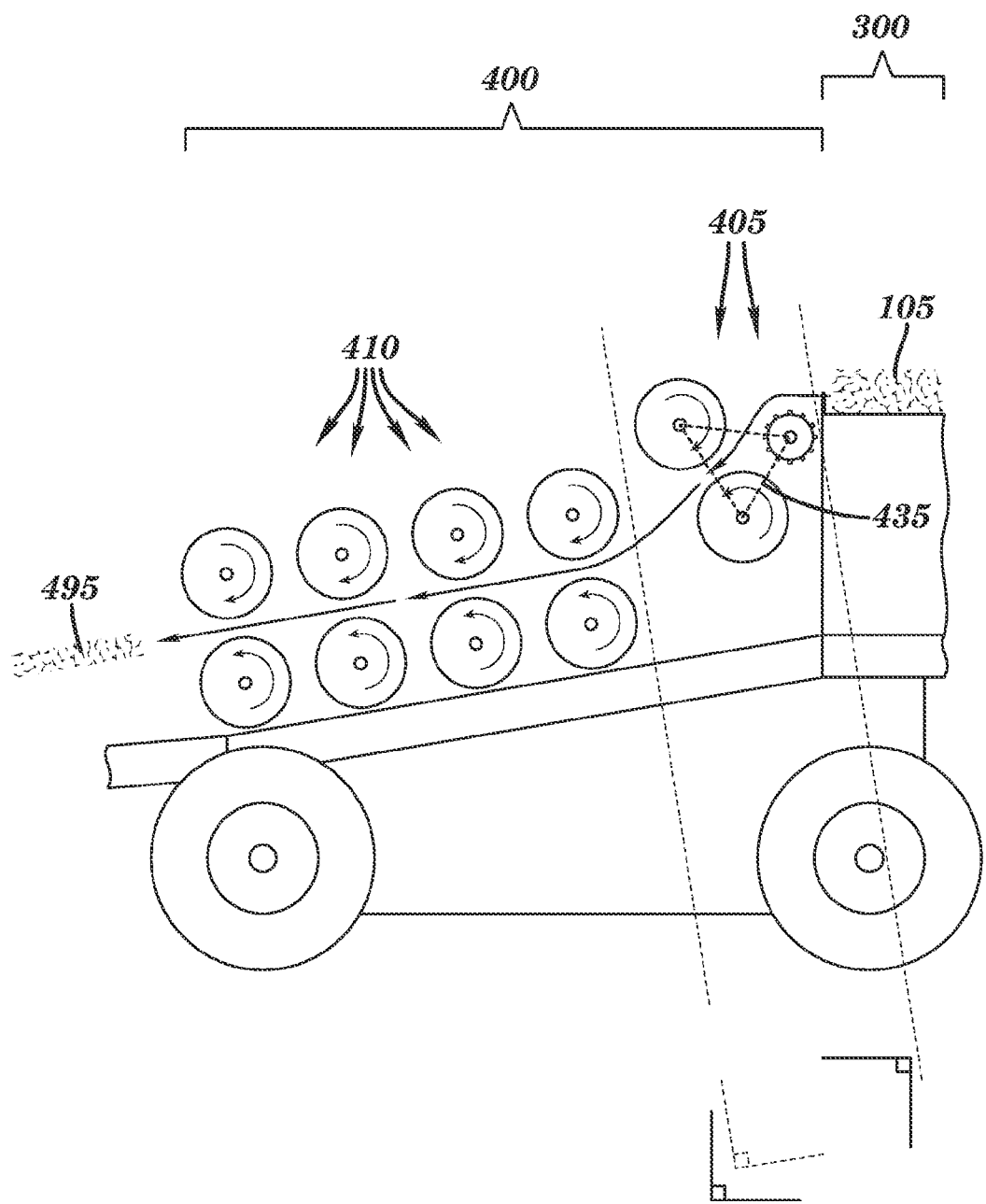

In FIG. 4c, the angles 460 of the feeder rolls 405 are shown diagrammatically. Note that the feeder rollers 405 are arranged in a polyhedron, which in this preferred embodiment is a triangle. Note also that the angles 460 are shown based on right angles that are oriented as opposing' angles, and the angles at which the flake 110 material moves through the system increase in acuteness.

Drawing rollers 410 receive the prepared agricultural crop product 105 from the feeder rollers 405. The drawing rollers 410 comprise two or more sets of two horizontal rotating cylinders 470. The cylinder faces 475 work in conjunction with each other to pull agricultural crop product 105 from the previous sets of rollers 405, 410. Pressure on the cylinders 470 is provided via either air 480 or spring compression 485 or tension 490. Each set of drawing rollers 410 is dependent on the other sets of drawing rollers 410 to eliminate freewheeling. The angular velocities of the sets of drawing rollers 410 increases from the first set to the last set by a predetermined amount, which, in a preferred embodiment, is within ranges shown in Table 1, below, and in FIG. 4c, described below. The feeding of the agricultural crop product 105 through the feeding 405 and drawing 410 rollers results in low-density agricultural crop product 495. This low-density material 495 is discharged from the last roller set 410 into the metering assembly 500.

TABLE 1

Ratio of drawing roll 405 sets

| Roll Set | Ratio in current embodiment | Allowable range |
|---|---|---|
| 1 to 2 | 2.751751 | 20-45% |
| 2 to 3 | 1.619645 | 50-80% |
| 3 to 4 | 1.358613 | 65-90% |
| 1 to 4 (overall) | 6.055147 | 10-25% |

As shown in Table 1, Roll #2 rotates 2.751751 times faster than does Roll #1, and Roll #4 rotates 6.055147 times faster than does Roll #1.

The feeder rollers 405 and drawing rollers 410 together reverse the packing of the agricultural crop product 105 that occurred to the material when it was initially baled. The drawing rollers 410 provide equal magnitude but opposite direction forces with respect to the x-axis each with respect to the other; in other words, each member of the two-roller set turns in a direction opposite that and at a rotation-per-minute rate that may be the same or different from that of the other member of the set. The drawing rollers 410 providing force, partnered with a specific texture on the roller surfaces 475, create sufficient friction between the drawing roller surfaces 475 and the flake 110 to each propel the flake 110 material at a specified linear velocity, said linear velocity increasing as the flake 110 material proceeds through the drawing roller sets 410. When the drawing roller sets 410 work thus in tandem, the increasing linear velocities caused by the multiple roller sets 410 working simultaneously on the same flake 110 cause friction bonds 465 within the agricultural crop product 105 to break down sufficiently to mimic the level of material bonding in agricultural crop product prior to any baling.

Figure 5:
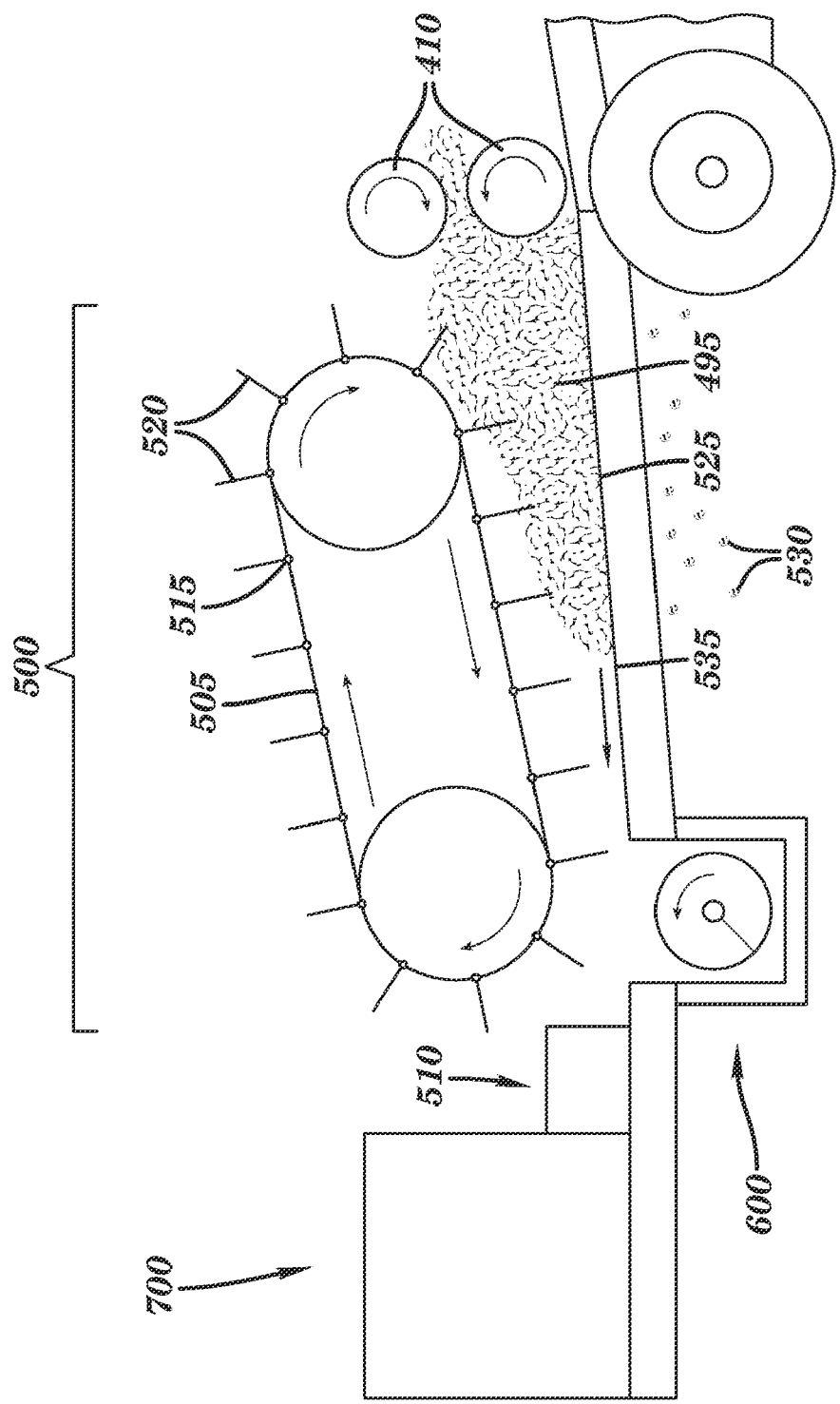
Referring now to FIG. 5, a metering assembly within an agricultural crop product unbaler is shown.

Referring now to FIG. 5, a metering assembly 500 within an agricultural crop product unbaler 100 is shown.

The chain set 505 of the metering assembly 500 is mounted over the path taken by the low-density agricultural crop product 495. The metering chain set 505 operates at a predetermined velocity relative to the pick-up head 510 of the small baler 700. The angular velocity of the pick-up head 510 is controlled by a cam follower 515 system. The cam follower 515 system has teeth 520 located before the small baler pick-up head 510. The teeth 520 enable, indeed require, the pick-up head 510 to gently draw the agricultural crop product 495 into the small baler 700, and the teeth 520 orient the fibers in the agricultural crop product 495. The cam follower 515 system moves the low-density agricultural crop product 495 to within a fraction of an inch of the small baler pick-up head 510. The low-density agricultural crop product 495 is moved across a lateral screen 525, which allows small crop particulates (chaff) 530 to fall out.

The angle between the metering assembly 500 and the drawing rollers 410 forces expelled agricultural crop product 495 to deflect off the cam follower 515 system onto a metering table 535. This action slows the agricultural crop product 495 and allows it to collect on the metering table 535 where the agricultural crop product 495 is fed at a consistent rate into a small baler 700.

Figure 6:
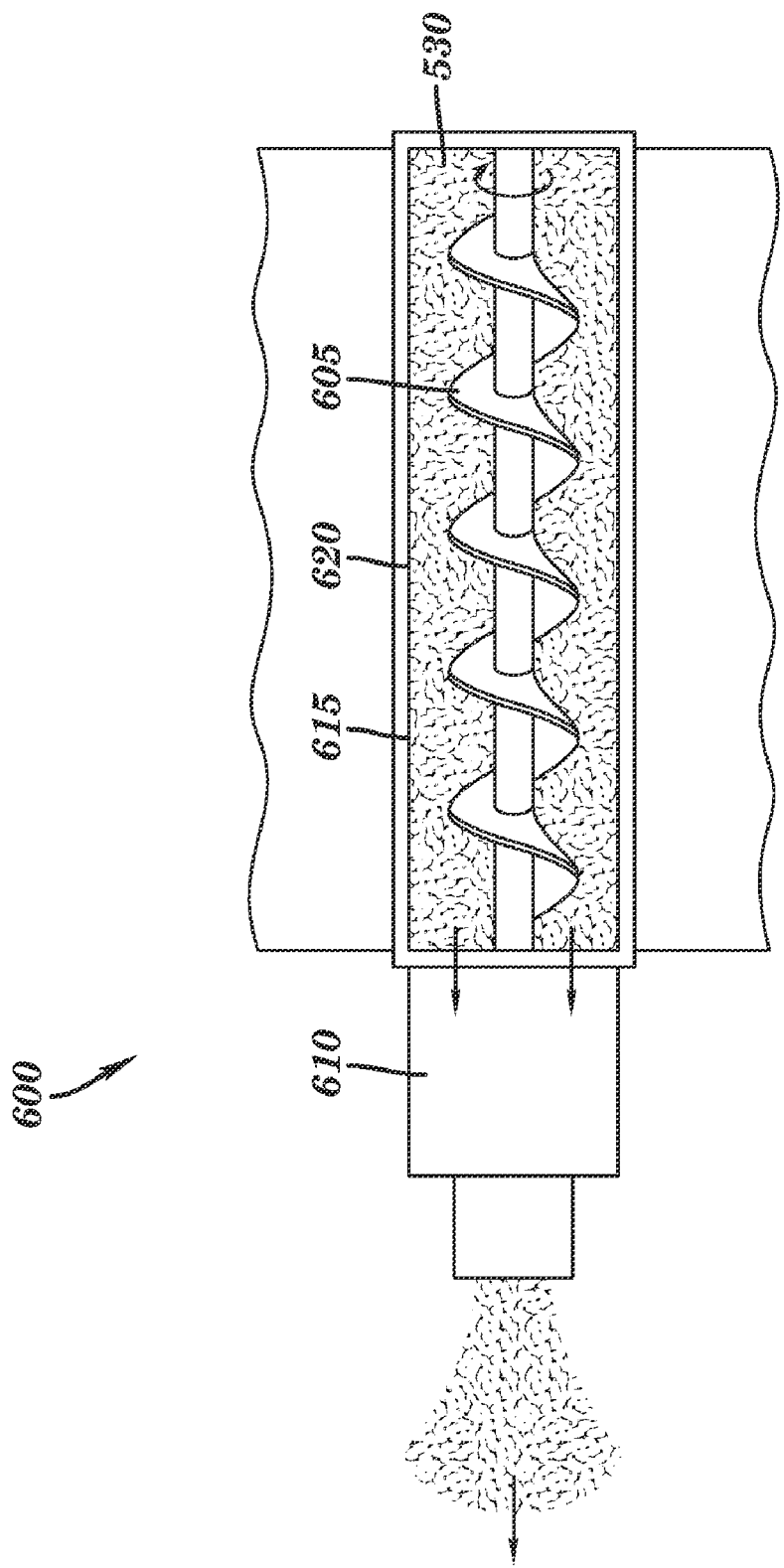
Referring now to FIG. 6, a metering assembly within an agricultural crop product unbaler is shown.

Referring now to FIG. 6, a chaff separating mechanism 600 within an agricultural crop product unbaler 100 is shown.

The chaff 530 that falls out of the metering system 500 is evacuated via a screw-type conveyor 605 and a blower 610. The conveyor 605 is set into a recessed channel 615 such as a trench or gutter. The recessed channel 615 may contain a lining 620 to allow the chaff 530 to move easily away from the assembly 100 and toward the blower 610. The conveyor 605 turns in a direction that pushes the chaff 530 through the recessed channel 615 toward the blower 610. When the chaff 530 reaches the blower 610, the force of air moving through the blower 610 propels the chaff 530 out of the assembly 100 and into a mound or pile 625 (not shown), from whence it is discarded or put to some other use that is not within the scope of the present invention.

Figure 7:
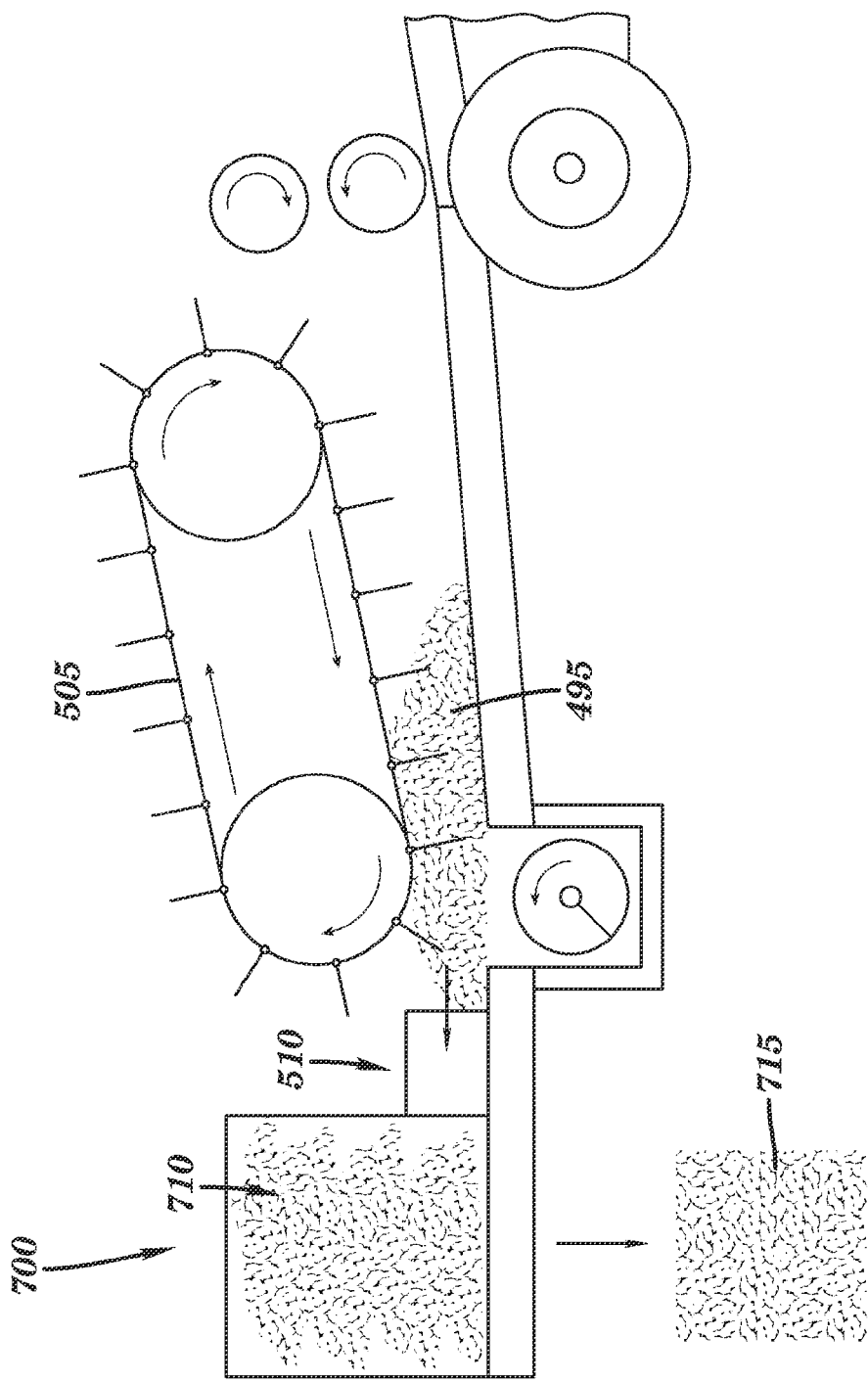
Referring now to FIG. 7, a chaff separating mechanism within an agricultural crop product unbaler is shown.

Referring now to FIG. 7, a small baler 700 within an agricultural crop product unbaler 100 is shown.

By adjusting the speed of a metering assembly overhead conveyor chain 530, the low-density agricultural crop product 495 that remains after the chaff 530 is removed may be drawn into a small baler 700 at a rate that mimics the operation of a small baler 700 on a windrow in a field 705 (not shown). The low-density agricultural crop product 495 is re-formed into small flakes 710 in the small baler 700. The small flakes 710 are then assembled into small bales 715 that are of a size that can be handled easily and dispersed to farm animals. This process mimics the process whereby a mobile small baler (not part of this invention) picks up windrowed material in a field 705 (not shown). The small flakes 710 formed by the apparatus 100 are indistinguishable from small flakes that are formed directly in the windrow or field 705 (not shown).

Figure 8:
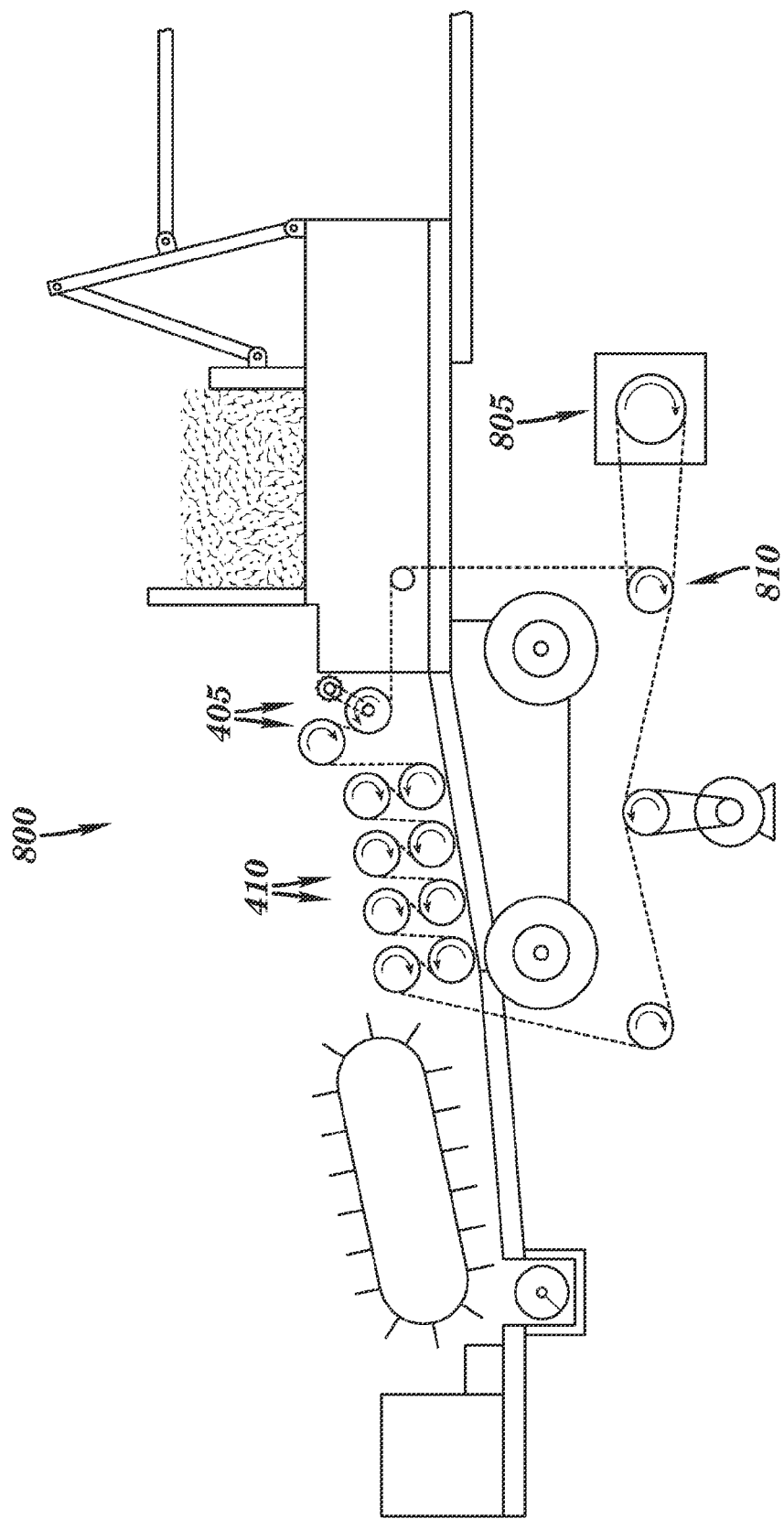
Referring now to FIG. 8, a small baler within an agricultural crop product unbaler is shown.

Referring now to FIG. 8, a power train 800 for the entire assembly 100 is shown.

In a preferred embodiment, the entire apparatus 100 is powered by an external power take-off (hereinafter "PTO")-driven transmission 805. The drawing roller 405 sets are powered directly from the speed transmission 810. All other functions are powered electrically, the electrical power deriving from the PTO-driven transmission 805 in a preferred embodiment, but other electrical power sources, such as generators, electrical service outlets, and other sources of electrical power are also conceivable and within the scope of the invention. Other power-train embodiments are also conceivable and within the scope of the invention. For example, the apparatus may be fitted with an internal power system 815 that replaces the external PTO-driven system 805. Alternatively, the apparatus may be partially powered by an internal power source 815 and partially by an external PTO-driven system 805. The apparatus may also be powered, in whole or in part, hydraulically.

Figure 9:
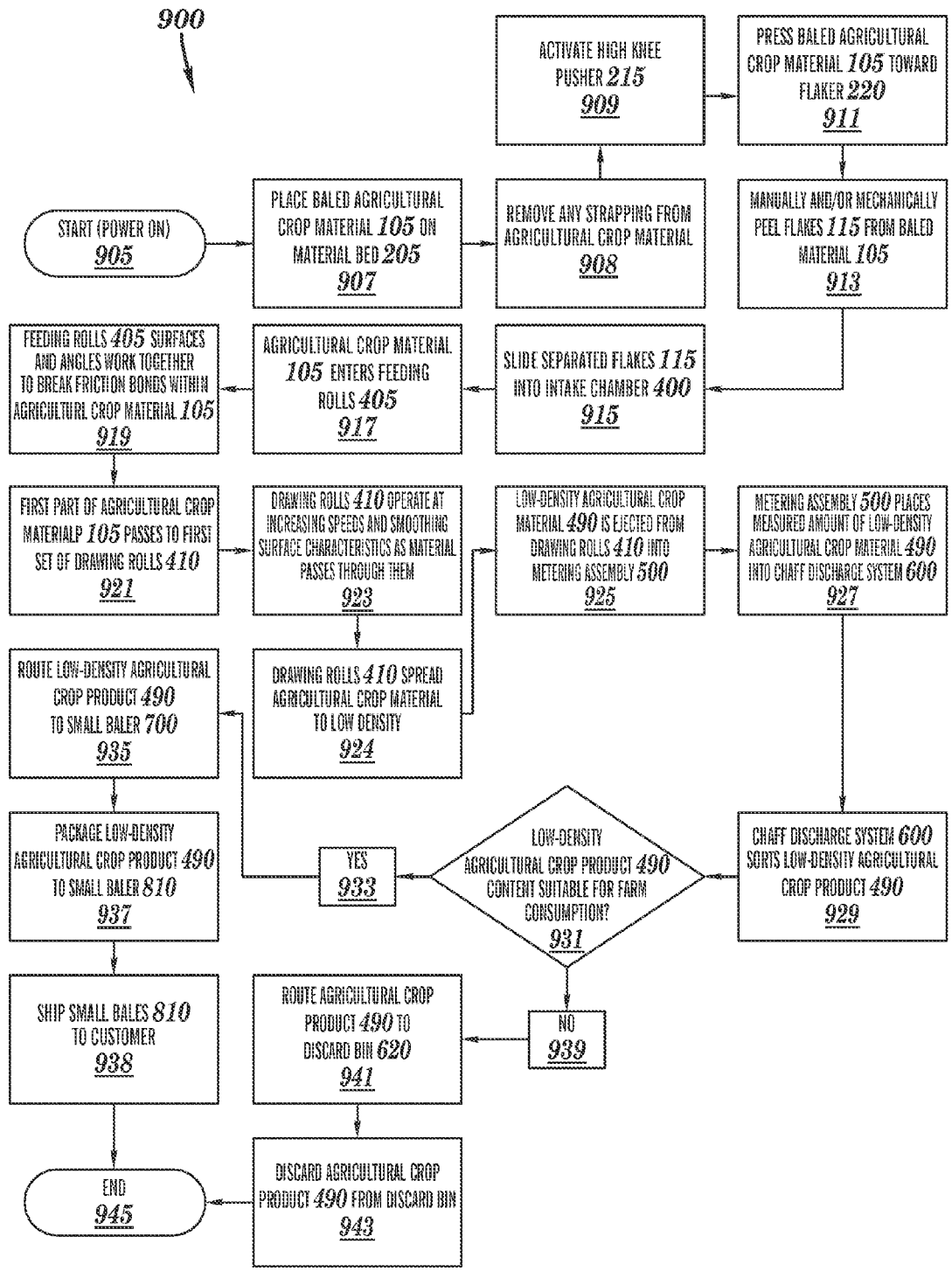
Referring now to FIG. 9, a process for using an agricultural crop product unbaler is shown.

Referring now to FIG. 9, a process 900 for using an agricultural crop product unbaler is shown.

After powering the system up 905, baled agricultural crop product 105 is placed 907 on the material bed 205, any strapping is removed 908 from the baled agricultural crop product 105, and the high knee pusher 215 is activated 909. The pusher 215 presses 911 the baled agricultural crop product 105 toward the flaker 220 and staging area 300. Flakes 115 are manually or mechanically peeled 913 from the baled agricultural crop product 105. Separated flakes 115 slide 915 into the intake chamber 400 and enters 917 the feeding rollers 405. The feeding rollers 405 faces 425 and angles 460 work together 919 to break friction bonds 465 within the agricultural crop product 105. The agricultural crop product 105 then passes 921 to the drawing rollers 410, which operate 923 at successively increasing speeds and have increasingly smooth surface characteristics as the agricultural crop product 105 passes through them. The drawing rollers 410 spread 924 the agricultural crop product 105 to low density 495.

The low-density agricultural crop product 495 is ejected 925 from the drawing rollers 410 into the metering assembly 500, which places 927 a measured amount of low-density agricultural crop product 495 into the chaff discharge system 600. The chaff discharge system 600 sorts 929 the low-density agricultural crop product 495, determining 931 whether the material 495 is suitable for farm consumption. If the material 495 is suitable 933, the material 495 is routed 935 to a small baler 700, packaged 937 into small bales 810, and shipped 938 to the customer, and the process ends 945. If the material 495 is not suitable 939, the chaff 530 falls 940 through a lateral screen 525 and is routed 941 via a chaff discard system 600 through a recessed channel 615 to a chaff pile 625 and is discarded 943. The process ends 945.

A first advantage of the invention is that there is little, if any, reduction in agricultural crop product length.

A second advantage of the invention is the lower-density second-generation bale has minimal chaff, typically less than five percent by weight.

A third advantage of the invention is that the drawing rollers work to draw the flake further down the line by using progressively increasing angular velocities.

A fourth advantage of the invention is that contact friction in the drawing and feeder roller sets is maintained by adjustable mechanized energy storage devices.

A fifth advantage of the invention is the feeder rollers are reversible and clutched with a safety switch.

A sixth advantage of the invention is the feeder and drawing rollers rotate such that the contacting faces move in the same direction with respect to the path of the moving material. The two cylinders of a drawing roll set rotate in opposite direction with respect to the longitudinal axis of the cylinders. The tangential surfaces of each individual cylinder of a set converge on a common plane applying distinct forces to the crop material. These coplanar forces associated with the cylinders of a drawing roll set create a resultant on the crop material at the contact point between the paired cylinders and the crop material. The resultant, in conjunction with resultants from other drawing roll sets, work, in tandem, to break down friction bonds in the crop material. Resultants from various drawing roll sets share a common direction but vary in magnitude.

A seventh advantage of the invention is the feeder chain cam follower on the metering assembly directs the feeder teeth to a vertical position relative to the metering assembly table. A cam follower maintains this position for the entire travel toward the attached baler pick-up head.

An eighth advantage of the invention is the feeder rollers deflect the incoming flake through two or more supplementary angles to tenderize the flake and loosen it at folds naturally present within the flake.

A ninth advantage of the invention is the roller sets are suspended so that the apparatus may accept and process flakes having varying width. The movement of the rollers is controlled by a guide system attached to shafts on the longitudinal axis.

A tenth advantage of the invention is the texture of the rollers initially is aggressive: recessed rubber comprises the cylinder surface of the feeder roller set, the recessed rubber actually intermeshing in one embodiment, and then the texture roughness is successively reduced until there is a smooth roller set for the final set of drawing rollers.

An eleventh advantage of the invention is the diameter of the rollers may range from a substantially four-inch expeller to substantially twelve-inch feeder rollers.

A twelfth advantage of the invention is the length of the roller contact surface is, in a preferred embodiment, a minimum of fifty-one inches. This allows the system to accept either three- or four-foot big bales.

A thirteenth advantage of the invention is all sets of rollers are positively driven, which allows for no freewheeling and maintains the desired respective angular velocity ratios at all times.

A fourteenth advantage of the invention is that under the metering assembly there are two converging planes, which, together, lead to a center trough where chaff is augured away by a screw-type conveyor.

A fifteenth advantage of the invention is that the final twenty-four inches of the metering assembly table is comprised of fingers protruding along the plane of the table, allowing chaff to be screened out of the agricultural crop product stream prior to the agricultural crop product entering the small baler pick-up head. This process decreases the density of the agricultural crop product by a minimum of a factor of three.

A sixteenth advantage of the invention is the metering assembly feed chain has a linear velocity which is set to cause the small baler pick-up head to draw the agricultural crop product, and to maintain a steady flow of material from the characteristically surging drawing roller assembly.

The embodiments provided here are examples only and are not intended to be a complete listing of possible embodiments, nor should they be construed as an exclusive listing of embodiments. Variations in the described invention and its uses are possible within the scope of this disclosure without departing from the subject matter coming within the scope of claims to be examined, and a reasonable equivalency thereof, which I regard as my invention.

We claim:

1. An apparatus for decreasing the density of agricultural crop product that has been compressed into two or more flakes, the flakes having been then further compressed into a large bale, the apparatus comprising:
    a material bed of sufficient size to hold several large flakes and high knee pusher assembly;
    a staging area;
    an intake chamber containing at least one set of feeder rollers, said feeder rollers comprising a plurality of horizontal cylinders and having faces that work in conjunction with each other to feed said agricultural crop product forward through said feeder rollers, said feeder rollers having pressure between them generated by a member of the group consisting of tension springs and air-bag compression, said feeder rollers' axes of rotation forming a polyhedron, and a plurality of sets of drawing rollers, said drawing rollers being dependent each on the other to prevent freewheeling and pressure on said drawing rollers being provided by a member selected from the group consisting of tension spring compression and air, each set of said drawing rollers rotating at a progressively faster velocity than the set of said drawing rollers preceding it in said apparatus;
    a metering assembly;
    a chaff discharge system; and
    a small baler to contain low-density agricultural crop product that has passed through said apparatus.

2. The apparatus of claim 1 further comprising said pusher assembly, staging area, feeder rollers, and drawing rollers being mounted on a chassis, said chassis capable of being mobile or immobile.

3. The apparatus of claim 1 further comprising said material bed containing a flaker of sufficient size to peel individual flakes from a large bale.

4. The apparatus of claim 1 further comprising said staging area being comprised of a platform parallel to said material bed with a one- to two-inch drop in vertical height to aid in separating advancing flakes from said bale, a plurality of spring fingers that function to keep agricultural crop product from prematurely advancing that work: in conjunction with a hoop that also functions to keep said agricultural crop product from prematurely advancing.

5. The apparatus of claim 1 further comprising said staging area having a step that allows a person to access said material bed and staging area.

6. The apparatus of claim 1 further comprising said high knee pusher being moved along said material bed by means of a hydraulic ram controlled by a hydraulic valve.

7. The apparatus of claim 1 further comprising said intake chamber containing one set of feeder rollers wherein the number of feeder rollers in said set is selected from the group consisting of three, four, and five.

8. The apparatus of claim 1 further comprising said polyhedron being a triangle.

9. The apparatus of claim 1 further comprising said agricultural crop product being fed through said feeder rollers at various angles 460, said angles 460 capable of ranging from substantially 0° to substantially 180°.

10. The apparatus of claim 1 further comprising said drawing rollers picking up said agricultural crop product from said feeder rollers.

11. The apparatus of claim 1 further comprising said feeder and drawing rollers applying sufficient pressure on intermediate crop material to hold said material with a maximum of 20% slippage.

12. The apparatus of claim 1 further comprising said drawing rollers being placed in pairs.

13. The apparatus of claim 1 further comprising said drawing roller faces working in conjunction each with the other to pull said agricultural crop product from previous sets of rollers.

14. The apparatus of claim 1 further comprising multiple drawing roller pairs working simultaneously on the same flake to break down friction bonds within said agricultural crop product.

15. The apparatus of claim 1 further comprising said metering assembly comprising a chain set that operates at a predetermined velocity relative to a pick-up head of a small stationary baler.

16. The apparatus of claim 15 further comprising velocity of said pick-up head being controlled by a cam follower system, said cam follower system functioning to move said agricultural crop product to within a fraction of an inch of said small baler pick-up head.

17. The apparatus of claim 1 further comprising crop material being fed to said small stationary baler to produce small flakes that are indistinguishable from small flakes that are formed directly in the windrow or field 705.

18. The apparatus of claim 1 further comprising said chaff separating mechanism comprising a lateral screen, said lateral screen allowing said chaff to selectively fall through said screen, a screw-type conveyor and a blower.

19. The apparatus of claim 18 further comprising said chaff being transported by said screw-type conveyor through a recessed channel toward a blower, said blower having sufficient force of air to propel said chaff out of said assembly and into a mound for later disposal.

20. The apparatus of claim 18 further comprising said recessed channel being lined with a material that allows said chaff to move more easily through said recessed channel.

21. The apparatus of claim 1 further comprising said small baler re-forming said agricultural crop product into small flakes for subsequent assembly into a small bale.

22. The apparatus of claim 1 further comprising said drawing rollers being powered directly from a speed transmission within said PTO-driven transmission by a power method selected from the group consisting of electric and hydraulic.

23. The apparatus of claim 1 further comprising all functions except said drawing rollers being powered by a method selected from the group consisting of electrically and hydraulically.

24. The apparatus of claim 1 further comprising said apparatus being powered by any combination of members of the group consisting of an internal power system and an external power take-off-driven system.

25. A method for lowering the density of baled agricultural crop product comprising:
    powering up an apparatus designed to lower the density of baled agricultural crop product;
    placing said baled agricultural crop product on a material bed;
    removing any strapping from said baled agricultural crop product;

activating a high knee pusher which presses said baled agricultural crop product toward a flaker and staging area;

manually peeling flakes 115 from said baled agricultural crop product;

sliding said peeled flakes into an apparatus intake chamber;

allowing said agricultural crop product to enter a set of feeding rollers within said intake chamber;

allowing faces and angles of said feeding rollers to work together to break friction bonds within the said agricultural crop product;

passing said agricultural crop product to a set of drawing rollers within said intake chamber, said drawing rollers operating at increasing speeds and having increasingly smooth surface characteristics as said agricultural crop product passes through said drawing rollers;

spreading said agricultural crop product to low density by passing said agricultural crop product through said drawing rollers, ejecting said low-density agricultural crop product from said drawing rollers into a metering assembly;

placing a measured amount of low-density agricultural crop product into a chaff discharge system;

sorting said low-density agricultural crop product to determine whether said low-density agricultural crop product is suitable for farm consumption routing suitable low-density crop product to a small baler packaging said suitable low-density crop product into small bales; and routing chaff through a lateral screen to a chaff discard system.

\* \* \* \* \*